US008304460B2

(12) United States Patent
Lau et al.

(10) Patent No.: US 8,304,460 B2
(45) Date of Patent: Nov. 6, 2012

(54) METHODS FOR MAKING COMPOSITES HAVING THERMOPLASTIC PROPERTIES FROM RECYCLED CROSSLINKED POLYMER

(75) Inventors: Willie Lau, Lower Gwynedd, PA (US); Donald C. Schall, Lansdale, PA (US); Harry R. Heulings, IV, Maple Shade, NJ (US); Kimberly B. Kosto, Maple Glen, PA (US); Joseph M. Rokowski, Barto, PA (US)

(73) Assignee: Rohm and Haas Company, Philadelphia, PA (US)

( * ) Notice: Subject to any disclaimer, the term of this patent is extended or adjusted under 35 U.S.C. 154(b) by 380 days.

(21) Appl. No.: 12/456,473

(22) Filed: Jun. 17, 2009

(65) Prior Publication Data
US 2010/0009152 A1 Jan. 14, 2010

Related U.S. Application Data

(60) Provisional application No. 61/134,581, filed on Jul. 11, 2008, provisional application No. 61/217,287, filed on May 29, 2009.

(51) Int. Cl.
*C08J 11/04* (2006.01)
(52) U.S. Cl. ......... 521/41; 521/40; 521/40.5; 521/42.5; 521/43.5; 521/44; 528/480; 528/499; 528/520 R; 528/502 F; 528/503; 516/9; 516/98; 524/68; 524/71; 524/922; 525/50; 525/55; 525/56; 525/232; 428/141; 428/147
(58) Field of Classification Search .................. 521/40, 521/40.5, 41, 43.5, 44, 45.5, 46, 47, 48; 264/308, 264/309; 516/9, 98, 198; 524/68, 69, 70, 524/71, 76, 922; 528/480, 499, 502 R, 502 D, 528/502 E, 502 F, 503; 428/141, 142, 144, 428/147; 525/50, 55, 56, 232, 238, 242
See application file for complete search history.

(56) References Cited

U.S. PATENT DOCUMENTS

| 5,258,222 | A | 11/1993 | Crivelli |
| 5,814,673 | A | 9/1998 | Khait |
| 5,985,366 | A * | 11/1999 | Wright ................ 427/340 |
| 6,060,555 | A | 5/2000 | Wright |
| 6,207,723 | B1 | 3/2001 | Matsushita et al. |
| 6,417,251 | B1 | 7/2002 | Brady |
| 6,743,836 | B2 | 6/2004 | Rouse et al. |
| 6,797,216 | B2 | 9/2004 | Furgiuele et al. |
| 2004/0076820 | A1 | 4/2004 | Hodgson |
| 2005/0035484 | A1 | 2/2005 | Meyers, III et al. |
| 2006/0151643 | A1 | 7/2006 | Tirelli et al. |
| 2007/0173567 | A1 | 7/2007 | Ishino |
| 2009/0215963 | A1 | 8/2009 | Coiai |

FOREIGN PATENT DOCUMENTS

| CZ | 217718 | | 5/1982 |
| DE | 238 807 | A1 | 9/1986 |
| DE | 94 07 792 | U1 | 3/1995 |
| EP | 0 401 885 | A1 | 12/1990 |
| FR | 2828217 | A1 | 2/2003 |
| GB | 1 571 166 | A | 7/1980 |
| JP | 11323022 | A | 11/1999 |
| JP | 2004-4035681 | A | 2/2004 |
| JP | 2007-231153 | | 9/2007 |
| KR | 2001-0065946 | | 7/2001 |
| KR | 2001 0065946 | A | 7/2001 |
| KR | 2001-0099223 | | 11/2001 |
| KR | 2006-0075620 | | 7/2006 |
| KR | 2006-0075621 | | 7/2006 |
| SU | 694516 | A | 10/1979 |

OTHER PUBLICATIONS

Naskar et al; "Thermoplastic Elastomeric Composition Based on Ground Rubber Tire", Polymer Engineering and Science, Jun. 2001, vol. 41, No. 6 pp. 1087 to 1098.
Sadhan K. De et al; "Rubber Recycling by Blending With Plastics", Rubber Recycling, Taylor & Francis, 2005, pp. 247-299.
Oliphant et al; "Ground Rubber Tire-Polymer Composites"; Recycling of Plastics Materials, ChemTec Publishing, 1993, pp. 153-170.
Database WPI Week 198025, Thomson Scientific, London, GB; AN 1980-44601C, XP002552408 & SU 694516 A (Yarosl Poly) (Nov. 22, 1979) Abstract.

* cited by examiner

*Primary Examiner* — Frances Tischler
(74) *Attorney, Agent, or Firm* — Andrew E. C. Merriam

(57) ABSTRACT

The present invention provides methods of making shapeable composites in the form of finely divided materials or articles and the materials and articles produced by the methods, the methods comprising forming mixtures by (i) treating an aqueous thermoplastic acrylic or vinyl polymer to increase the particle size thereof to a weight average particle size of 1 μm or more, and, optionally, dewatering to form a crumb mixture; and (ii) combining a thermoplastic acrylic or vinyl polymer with one or more waste rubber vulcanizate having a sieve particle size ranging from 10 to 600 μm in the amount of from 15 to 95 wt. %, based on the total weight of polymer and rubber to form a crumb slurry, such that (ii) can take place before, during, after (i) but before any dewatering, or after any dewatering; and (iii) thermoplastic processing the mixture. Thermoplastic processing can directly form articles, like sheets or films. The shapeable composites have excellent adhesion to other materials. In one embodiment, the sheets and films can be formed into laminates.

6 Claims, No Drawings

METHODS FOR MAKING COMPOSITES HAVING THERMOPLASTIC PROPERTIES FROM RECYCLED CROSSLINKED POLYMER

This application claims priority from U.S. provisional application No. 61/134,581, filed on Jul. 11, 2008, and from U.S. provisional application No. 61/217,287, filed on May 29, 2009.

The present invention relates to methods for making shapeable composite materials or articles from a mixture comprising waste crosslinked rubber and aqueous thermoplastic polymer dispersion or emulsion, the emulsion treated to increase its particle size. More particularly, it relates to methods for making shapeable composite materials that behave like a thermoplastic from waste rubber vulcanizates and aqueous thermoplastic acrylic or vinyl polymers and to shaped composite articles made thereby.

Thermoplastic or polymeric materials can be crosslinked into thermosets via chemical crosslinking (curing) to make stronger and more durable materials. Known thermoset materials include, for example, vulcanized rubber (vulcanizate), phenolic resins, aminoplast resins, e.g. melamine resins, epoxy resins and cross-linked polyolefins (PEX). The crosslinking results in an irreversible network of bonds which render the material unsuitable for recycling of the thermosets by thermoplastic processing and/or reshaping into useful articles. For this reason, a large portion of these materials has been disposed in landfill.

One waste thermoset, automotive tires, total 300 million per year in North America and have attracted a lot of attention in recent years in an effort to reduce the demand in landfill. Currently, nearly 80% of the tires are being recycled. However, about half of the recycled tires are being down-cycled via burning in cement kilns. In other uses, the waste tires are ground to form Ground Tire Rubber (GTR) by shredding, ambient and cryogenic milling at sieve particle sizes of 1520 down to 74 µm (10-200 mesh). GTR is used in athletic fields, with epoxy or urethane glue in floor mats, and at a low level (<10 wt. %) in the production of new tires.

Other known methods include the preparation of polyolefin-grafting-polar monomer copolymer by mechanochemical methods, preparing rubber powder with high surface activity from waste tire rubber, and devulcanizing waste vulcanizate which can be used to form polymer/rubber powder composites. The mechanochemical methods are expensive. Further, all of the methods mentioned provide articles which cannot be recycled without being re-ground into fines, an expensive proposition.

Although waste rubber tires have received much attention, the problem of recycling rubber remains far more reaching than the recycling of waste tires. There remains a need for economically viable methods to combine thermoset polymers, like waste vulcanized rubber, with thermoplastic polymers, such that the new composites can be effectively upcycled or converted back to thermoplastic compositions, without loss of mechanical properties of the constituent polymers.

The art of U.S. Patent publication no. 20040076820, to Hodgson, discloses methods of making composite products wherein a substrate material such as lignocellulose particles or rubber and a plastic binder are combined and melt processed into a shapable article, such that either the substrate or the plastic is in the form of an emulsion. However like other known methods, Hodgson's methods involve the use of reactive binders to make products and cannot be recycled without being re-ground into fines. Hodgson's methods are very limited in applications for making materials that are flexible because even if only a very small amount of about 6 wt. % of a reactive binder is used as glue the resulting materials are rigid; the resulting materials fail to provide the properties of both rubber and the binder. In addition to this, the resulting products are no longer thermoplastic and fail to have a homogeneous appearance.

The present inventors have endeavored to solve the problem of providing a useful thermoplastic material from recycled thermoset rubber materials and a thermoplastic aqueous polymer that retains the mechanical properties of the constituent polymers and the properties of the recycled thermoset even where the proportion of thermoset rubber is higher than 10 wt. % of the composite.

STATEMENT OF THE INVENTION

According to the present invention, methods of making shapeable composite materials and articles thereof comprise forming a mixture by (i) treating an aqueous composition comprising one or more aqueous thermoplastic acrylic or vinyl polymer to increase the particle size of the polymer to a weight average particle size of 1 µm or more, and, optionally, subjecting the treated aqueous polymer to dewatering; and, (ii) combining a composition comprising one or more acrylic or vinyl polymer with one or more waste rubber vulcanizate having a sieve particle size ranging from 10 to 600 µm, or, preferably, 180 µm or less, in the amount of from 15 to 95 wt. %, or, preferably, 40 wt. % or more, based on the total weight of polymer and rubber to form a crumb slurry; and, optionally, dewatering the mixture to form a crumb mixture, optionally, followed by drying, wherein, the combining (ii) can take place before the treating of the aqueous composition, during the treating of the aqueous composition, after the treating of the aqueous composition but before any dewatering, and after any dewatering; and, (iii) thermoplastic processing the resulting mixture.

In one embodiment, the shapeable composite materials of the present invention exhibit, when compression molded to form 0.1 cm thick sheets, a tensile strength of 90% or more as high as the waste rubber vulcanizate alone compression molded in the same manner and an elongation at break of 190% compared to the elongation at break of the waste rubber vulcanizate alone compression molded in the same manner. The waste rubber vulcanizate preferably comprises ground tire rubber (GTR).

The treating of the aqueous composition or crumb slurry to increase the particle size of the acrylic or vinyl polymer to the desired particle size can be chosen from coagulating, freeze drying, and coagulating followed by freeze drying. To allow the most effective mechanical compounding to form the composite material, the particles of the aqueous acrylic or vinyl polymer have a weight average particle size of 1 µm or more, preferably 20 µm or more, or, preferably up to 100 µm.

Thermoplastic processing may be chosen from extrusion, calendering, two roll milling, injection molding, compression molding, and combinations thereof, such as, for example, in a devolatilizing extruder, single screw extruders, twin screw extruders, counter rotating twin screw extruder; in an extruder followed by a compression mold, and combinations thereof.

In another embodiment, the shapeable composite materials are formed into multilayer articles by forming sheets or films and laminating the sheets or films with other sheets, films or lamina. Accordingly, the present invention provides multilayer articles, such as laminates and tapes, e.g. traffic tapes wherein one or more layer comprise the shapeable composite materials of the present invention.

In the methods and materials of the present invention, suitable thermoplastic acrylic or vinyl polymers may comprise any acrylic or vinyl polymer, such as acrylic-styrene polymers or styrene polymers. Preferred acrylic or vinyl polymers may be chosen from any polymer comprising the reaction product of 25 wt. % or more of an acrylic monomer. More preferably, the acrylic or vinyl polymer may be chosen from a suspension copolymer, a polymer comprising the copolymerization product of a first acrylic or vinyl monomer the homopolymer of which has a measured glass transition temperature (Tg) of 20° C. or less with a copolymerizable monomer the homopolymer of which has a Tg at least 20° C. greater than the Tg of the homopolymer of the first acrylic or vinyl monomer, and a metastable emulsion polymer, and mixtures thereof.

In yet another embodiment, the acrylic or vinyl polymer of the present invention, the acrylic or vinyl polymers comprise the copolymerization product of a first acrylic or vinyl monomer the homopolymer of which has a measured glass transition temperature (Tg) of 20° C. or less, such as BA or EHA, with a copolymerizable monomer the homopolymer of which has a Tg at least 20° C. greater than the Tg of the homopolymer of the first acrylic or vinyl monomer, such as styrene.

In still another embodiment, the shapeable composite materials include soft aqueous acrylic or vinyl polymers having a Tg of 0° C. or less such that the waste rubber vulcanizate exhibits a reinforcing effect, resulting in composite materials that exhibit a tensile strength at least 40% higher than articles and materials comprising the acrylic or vinyl polymer alone.

In the methods and materials of the present invention, the waste rubber vulcanizate can comprise, for example, GTR, styrene butadiene rubber (SBR), ethylene propylene-diene rubber (EPDM), butadiene rubber, natural rubber, mixtures thereof, and combinations thereof.

In an embodiment of the products according to the present invention, the thermoplastic shapeable composite materials consist essentially of one or more thermoplastic aqueous acrylic or vinyl polymer and one or more waste rubber vulcanizate made by the methods of the present invention. Accordingly, to retain their thermoplastic nature during processing and in use, the shapeable composite materials and articles thereof of the present invention omit crosslinking or curing agents, thermosettable (curable) resin or polymers, and compatibilizers.

In another product embodiment, the present invention provides multilayer articles for use as pavement markings, pavement marking tapes, or traffic tapes comprising thermoplastic shapeable composite materials made by the inventive method as one or more layer or film. Such shapeable composite materials are heat sealable and adhere to the substrate when softened by heat. Further, such articles may comprise one or more additional layer or film chosen from a traffic paint top layer or film, an adhesive sub layer or film, a release sub layer or film, and combinations thereof. Preferably, multilayer articles for use as pavement markings, pavement marking tapes, or traffic tapes comprise a layer or film made from quick setting aqueous binders such as, for example, anionically stabilized acrylic emulsion polymers A) and polyfunctional amines B), wherein the amount of volatile base is sufficient to raise the pH of the fast-dry aqueous dispersion composition to the point where 20% or more, or 60% or more, or substantially all, of the polyfunctional amines are in a non-ionic state (deprotonated), available as Fastrack™ paint (Dow Advanced Materials, Philadelphia, Pa.). The multilayer articles may additionally comprise absorbers, or reflective beads, or both, as is known in the art.

Unless otherwise indicated, any term containing parentheses refers, alternatively, to the whole term as if no parentheses were present and the term without them (i.e. excluding the content of the parentheses), and combinations of each alternative. Thus, the term "(meth)acrylic" refers to any of acrylic, methacrylic, and mixtures thereof.

All ranges are inclusive and combinable. For example, a sieve particle size of 10 to 600 µm, or 200 µm or less, or, preferably, 180 µm or less, or, more preferably, 100 µm or less includes ranges of from 10 to 100 µm, from 10 to 180 µm, from 10 to 200 µm, from 10 to 600 µm, from 100 to 200 µm, from 100 to 180 µm, from 100 to 600 µm, from 180 to 200 µm, from 180 to 600 µm, and from 200 to 600 µm.

As used herein, the term "acrylic" refers to materials made from a major proportion of acrylate, methacrylate, acrylic or methacrylic acid or (meth)acrolein monomers, polymers or resins.

As used herein, the phrase "aqueous" includes water and mixtures comprising 50 wt. % or more of water in a mixture of water with water-miscible solvents.

As used herein, the phrase "emulsion" refers to any two phase fluid systems wherein the continuous phase is aqueous. The phrases "emulsion" and "dispersion" can be used interchangeably.

As used herein, unless otherwise indicated, the word "polymer" includes, independently, homopolymers, copolymers, terpolymers, block copolymers, segmented copolymers, graft copolymers, and any mixture or combination thereof.

As used herein, the term "sieve particle size" refers to the particle size of a material that would completely pass through a mesh sieve of the given particle size. For example, GTR that passes through a 203 micron sized sieve (60 mesh) is referred to as having a 203 micron sized sieve particle size. For a given material, a mesh sieve particle size will be larger than the weight average particle size.

As used herein, unless otherwise indicated, the term "glass transition temperature" or "Tg" refers to the glass transition temperature of a material as determined by Differential Scanning Calorimetry (TA Instrument model Q-1000) scanning between −90° C. to 150° C. at a rate of 20° C./min. The Tg is the inflection point of the curve.

As used herein, unless otherwise indicated, the term "calculated glass transition temperature" or "calculated Tg" refers to the glass transition temperature of a material as determined by the Fox Equation as described by Fox in *Bulletin of the American Physical Society*, 1, 3, page 123 (1956).

As used herein, unless otherwise indicated, the term "weight average particle size" refers to the weight average particle size of a material as determined using a light scattering technique with a Malvern Mastersizer 2000™ Particle Size Analyzer (Malvern Instruments Ltd., Malvern, Worcestershire, UK). Materials can include particles which are coagulated or flocculated polymers and polymer agglomerates.

The methods of the present invention produce thermoplastically shapeable or thermoformable composite materials and articles thereof that can comprise high levels of waste rubber vulcanizate ($\geq$50%) and that can be readily processed into useful products such as sheets, membranes and molded articles by conventional thermoplastic methods such as extrusion and compression molding. Because the shapeable composite materials are thermoplastic, sheets and films made therefrom can be heat welded or laminated together or to sheets, scrims, webs and films of other materials. The shapeable composite materials and articles thereof can be heat sealed or adhered to other articles. Further, shapeable composites made as articles can be thermoplastically reshaped and re-processed.

In addition, the shapeable composite materials made according to the methods of the present invention can be formed in the absence of crosslinking or curing agents and compatibilizers without resulting in composite materials that are tacky to the touch; such shapeable composites consist essentially of thermoplastic acrylic or vinyl polymer and waste rubber vulcanizate. Finally, because the shapeable composite materials are made from ground, shredded or pulverized waste rubber vulcanizate, the methods of the present invention enable the provision of up-cycled thermoplastic shapeable composite materials and articles without the need for expensive milling or grinding equipment.

The treating of an aqueous slurry of one or more aqueous acrylic or vinyl polymer or the crumb slurry of the polymer with one or more waste rubber vulcanizate to increase the particle size of the acrylic or vinyl polymer to a desired particle size can be chosen from coagulation, coagulation followed by freeze drying, and freeze drying of the slurry. Freeze drying can be used in addition to or in place of dewatering or of both dewatering and drying.

Useful coagulating agents include any known coagulation agents such as, for example, any chosen from a salt, such as sodium chloride or iron (ferric) chloride, i.e. $FeCl_3$, iron (ferrous) sulfate, i.e. $Fe_2(SO_4)_3$, alum, i.e. $Al_2(SO_4)_3$, magnesium sulfate, or preferably $FeCl_3$; an acid, such as a carboxylic acid, e.g. formic acid, or sulfuric acid to reduce the pH of the acrylic or vinyl polymer to 4.5 or less, preferably 4.0 or less; a chemical coagulant and mixtures thereof. Acids are preferred to reduce the need for repeated washing of the crumb mixture. Other chemical coagulants may include alumina, aluminium chlorohydrate, calcium oxide, polyacrylamide, sodium aluminate, and sodium silicate, and the like; and natural product coagulants may include chitosan, moringa oleifera seeds, papain, strychnos seeds, and isinglass, among others.

The acrylic or vinyl polymers are suitably coagulated to a weight average particle size of 1 μm or more, or 10 μm or more, or up to 5000 μm, or up to 1000 μm, or, preferably 20 μm or more, or, preferably up to 600 μm.

After coagulating, the aqueous acrylic or vinyl polymer or crumb mixture of polymer and waste rubber vulcanizate can be dewatered by filtering, pressing, freeze drying, spray drying or other known means, e.g. flocculation, and then, if desired, washed. Alternatively, the polymer or crumb mixture can be dewatered, if desired, washed, and then subjected to thermoplastic processing to remove volatiles, such as in a devolatilizing extruder.

Suitable thermoplastic processing of the crumb slurry or crumb mixture can form the composite and a shaped article in one step, or it can form a material, such as pellets, granules or powder, to be thermoformed later into a shaped article. Such thermoplastic processing effectively kneads and disperses the materials in the mixture, particularly with heating at any temperature that will sustain polymer flow during processing, for example, 100° C. or above, may dry them as well, and can, in addition, shape them into a desired article. Thermoplastic processing may be chosen from extrusion, calendering with heating, calendering without heating combined with other thermoplastic processing, two roll milling, injection molding, compression molding, rotational molding and combinations thereof. For example, extrusion may be used to form granules, powders or pellets for later molding or calendering. Extrusion may be carried out in extruders chosen from devolatilizing extruders, i.e. to dry a slurry mixture or dewatered mixture, single screw extruders, twin screw extruders, counter rotating twin screw extruders, or combinations thereof. In another example, two roll milling can be followed by compressing molding to make shaped articles by thermoplastic processing. Preferably, thermoplastic processing comprises kneading in a counter rotating twin screw extruder.

In an embodiment of the present invention, the extrusion or a similar melt-processing procedure may be used to form granules, powders or pellets that can later be formed into shaped articles or melted in use, such as for use in fillers and sealers. Accordingly the shapeable composites can take any such form.

In another embodiment, thermoplastic processing forms a sheet or film and the methods further comprise laminating the sheets or film with other sheets, films or lamina. Accordingly, the shapeable composites may comprise multilayer articles having the shapeable composite as one or more layer.

The shapeable composites of the present invention exhibit desirable strength and flexibility so that sheets of the shapeable composite, when compression molded in one or more stage to form a sheet having a thickness of 0.1 cm, exhibit a tensile strength as measured by ASTM D-2370 (2008) of 90% or more of and an elongation at break as measured by ASTM D-2370 (2008) of 190% or more of the respective tensile strength and elongation at break of a 0.1 cm thick compression molded sheet of the finely divided waste rubber vulcanizate alone, the shapeable composite sheet and the waste rubber vulcanizate sheet each being compression molded with the same molding apparatus and in the same one or more stage, each stage comprising molding at a given pressure and temperature for a given period of time. Compressing molding "stages" include, for example, initial pressing for 1-10 minutes at 2,000 to 50,000 Pascal and a temperature of 100 to 400° C., followed by one or more pressing stages for progressively longer periods at the same temperature and at higher pressures than initial pressing, and then followed by cooling with pressing at room temperature at from 2,000 to 50,000 Pascal.

In accordance with the present invention, the crumb slurry or crumb mixture that is subject to thermoplastic processing comprises from 15 to 95 wt. %, based on the total weight of polymer and rubber, of waste rubber vulcanizate, preferably 25 wt. % or more, or 40 wt. % or more, and, preferably, up to 75 wt. %. Thus, the remainder of polymer solids in the slurry comprises acrylic or vinyl polymer. Accordingly, the composite materials and articles of the present invention comprise from 15 to 95 wt. %, based on the total weight of polymer and rubber, of waste rubber vulcanizate, preferably 25 wt. % or more, or 40 wt. % or more, and, preferably, up to 75 wt. %.

Properties of the shapeable composite materials can be tailored by the design of the thermoplastic acrylic or vinyl polymer in the continuous phase, providing desirable properties such as toughness, low temperature flexibility, barrier properties, water resistance, good durability, paintability, etc.

In one embodiment, to achieve a balance of hardness and tensile properties, with flexibility and cold weather resistance properties, acrylic or vinyl polymers may comprise the copolymerization product of a first acrylic or vinyl monomer the homopolymer of which has a measured glass transition temperature (Tg) of 20° C. or less, such as butyl acrylate (BA) or ethylhexyl acrylate (EHA), with a copolymerizable monomer the homopolymer of which has a Tg at least 20° C. greater than the Tg of the the homopolymer of the first acrylic or vinyl monomer, such as methyl methacrylate (MMA) or styrene.

In a preferred embodiment, to improve low temperature flexibility, water resistance and melt strength, and to lower tack and improve block resistance, the acrylic or vinyl polymers comprise suspension polymers.

In a different polymer embodiment, the one or more acrylic or vinyl polymer may be a suspension copolymer of any two or more monomers which provide different advantages from one another. The two or more monomers may differ in properties of polymers they form or other attributes chosen from the Tg of their respective homopolymers, as discussed above, their miscibility in other materials, their hydrophobicity, their cost, and their ability to form storage stable polymers. For example, a low cost monomer can be suspension copolymerized with a less reactive monomer having any desirable property to enhance the overall quality of the suspension copolymer at a lower cost. Monomers that form polymers that are highly miscible with waste rubber vulcanizates may include, for example, nonionic surfactant monomers such as (poly) alkoxyalkyl(meth)acrylates, and fatty alkyl(meth)acrylates, such as lauryl methacrylate (LMA); monomers forming polymers not as highly miscible with waste rubber vulcanizates include, for example, the $C_1$ to $C_4$ alkyl(meth)acrylates which happen to be relatively inexpensive monomers; more hydrophobic polymers are made from monomers including aryl (meth)acrylates and $C_6$ to $C_{30}$ alkyl(meth)acrylate monomers; storage stable monomers are those forming high Tg acrylic or vinyl polymer.

In another different polymer embodiment, the one or more acrylic or vinyl polymer may be a metastable polymer, i.e. comprising the polymerization product of 5 wt. % or less, based on the weight of polymer solids, of dispersible monomer residues, preferably, 3 wt. % or less, or which comprise 2 wt. % or less, based on the weight of polymer solids, of surfactant, preferably 1 wt. % or less. As used herein, the term "dispersible monomer" refers to any polymerizable monomer which when polymerized would have an acid, acid salt, hydroxyl, amine or amine salt functional group.

Suspension polymerization to form acrylic or vinyl polymers can be carried out by known and conventional batch polymerization methods in water or in solvents. Where solvents are used, the suspension may be dried and suspended in an aqueous medium or inverted into an aqueous medium to remove solvent.

Aqueous emulsion polymerization to form thermoplastic acrylic or vinyl polymers can, except as shown above, be carried out by known and conventional polymerization methods with conventional reagents and surfactants.

Suitable waste rubber vulcanizate can be any having a sieve particle size of 10 to 600 µm, or 200 µm or less, or, preferably, 180 µm or less, or 170 µm or less, more preferably, 155 µm or less. Such waste rubber vulcanizate can be obtained, for example, in shredded or milled form, or as cryogenically ground waste rubber. The waste rubber vulcanizate can comprise fillers and impurities, such as metal mesh fines.

The shapeable composite materials may additionally comprise various additives as desired or required according to their end use, such as, for example, one or more of vulcanizing agent or crosslinking agent, antioxidant, UV-stabilizer, fire-retardant, colorant, organic and inorganic filler, e.g. thermoset (cured) polymer or resin, in the form of, for example, powders, fibers, slivers or chips; reinforcing material, such as non-wovens, or scrims; pigment; thermosettable (curable) resin or polymer; processing aid, such as mold release agents; or small amount of surfactants. The additives can be added before or during thermoplastic processing.

The shapeable composite materials of the present invention can be made into articles of any shape, such as sheets and films, or used as a molding or forming material. Being a thermoplastic, the shapeable composite material may be formed into a heat sealable membrane or articles such as hybrid products that comprise of multiple layers or segments with different properties, such as stiffness, having one or more layer or segment formed from shapeable composite materials of the present invention.

Films produced according to the present invention may be used in forming multilayer articles and laminates for many applications. Acrylic or vinyl polymer polymers may be selected according to their glass transition temperature (Tg) for specific applications. For example, polymers having a Tg of 20° C. or more generally find use in flooring, tile and molding applications, in coating films and in applications suitable for harder materials, articles and films; and polymers having a Tg of less than 20° C. find use in sealers and fillers, asphalt applications, and applications suitable for rubbery or flexible materials, articles or films.

Useful end products include, but are not limited to, automotive parts, such as tires, bumpers, gaskets, fan belts, wiper blades, liners, vibration-dampening mounts, underbody coating, insulation and trim; building products such as roofing membranes, roofing shingles or roofing felt; modified EPDM roofing membranes; modified neoprene articles; tiles or tile backings; carpet backings; asphalt sealers, asphalt underlayment or reinforcement, and asphalt concrete road surfacing material; crack filler for asphalt and cement; concrete modification; sound proofing materials; acoustic underlayment; flooring underlayment and matting; industrial products such as liners for landfill; sports utilities such as artificial turf and track; playground surfaces; mats and pads; ball cores; and consumer products such as floor tiles; shoe soles; liners; covers; and molded products.

The surface of the shapeable composite materials, e.g. as sheets, exhibit good adhesion to various substrates including, but not limit to, polyester scrim, acrylic film, polyester backing, aluminum foil, fiberglass, polyester wovens and webs. The surface also exhibits good adhesion characteristics to water based coatings and adhesives. Such adhesion property enables the simple formation of laminates, such as by coextrusion or contacting layers wherein one or more of the layers comprises shapeable composite material of the present invention.

In one embodiment, the laminate comprising a sheet or film of the shapeable composite material further comprises a coating thereon, such as a white roof coating or elastomeric coating, or an adhesive layer thereon, optionally with a further release layer covering the adhesive layer.

In a further preferred embodiment, the shapeable composite materials of the present invention may comprise one or more layer of a multilayer article useful for pavement marking, pavement marking tapes, or traffic tapes in the pavement marking industry. The shapeable composite materials may be heat sealable to a road or pavement surface and may comprise materials with or without vulcanizing, crosslinking or curing agents. Such multilayer articles may comprise an adhesive layer, a release layer, or both. Preferably, multilayer articles for use as pavement markings, pavement marking tapes, or traffic tapes may comprise one or more layer of paint, such as an acrylic or styrene-acrylic paint, such as, for example, a quick setting aqueous binder. The multilayer articles may additionally comprise absorbers, or reflective beads, or both, as is known in the art.

To avoid the known susceptibility of pavement marking or traffic tape to adhesive failure at the interface between the traffic paint and the tape backing, the present invention provides multilayer articles that provide a strong bond between the paint and the shapeable composite material layer or film as backing. Accordingly, traffic tape laminates comprising the shapeable composite materials of the present invention may find use as removable or permanent pavement markings, for example, as stop bars, legends, arrows, cross walks, skip lines, edge lines, contrast markings, black out markings, and specialized logos with colored design. Other specialty pavement markings include, for example, heat applied or hot-melt pavement marking, thermochromic pavement marking, raised or profiled pavement markings (wet night), rumble strips, and antimicrobial pavement markings. Other related uses include, for example, tapes of high reflectivity (comprising reflective beads) used for sides of trucks and cones and barrels, pavement tapes for roadway crack coverage, skid resistant area pavement coatings, and speed bumps and other traffic calming devices.

PREPARATION EXAMPLE 1

Preparation of Polymer/Rubber Crumb Mixtures

In the Examples, the following abbreviations are used:
BA=butyl acrylate MW=molecular weight
MMA=methyl methacrylate $FeCl_3$=Ferric Chloride
MAA=methacrylic acid
nDDM=n-dodecyl mercaptan Polymers with the following polymer compositions (and calculated Tg's) were used in the shapeable composite materials described in the Examples below:

Polymer A1 (46 BA/53 MMA/1 MM; Tg+11° C.)
Polymer A2 (46 BA/52 MMA/1 MAA/1 Adhesion Promoter; Tg+11° C.)
Polymer A3 (46 BA/52 MMA/1 MAA/1 nDDM; Tg+11° C.)
Polymer B (61 BA/39 MMA; Tg–11° C.)
Polymer B1 (61 BA/38 MMA/1 MAA; Tg–11° C.)
Polymer C1 (65 BA/34 MMA/1 MAA; Tg–16° C.)
Polymer D1 (77 BA/22 MMA/1 MAA; Tg–30° C.)

The shapeable composite materials were prepared according to the following procedure with the ingredients as depicted in Table 1. Water was added to a mixing vessel equipped with a mechanical stirrer; $FeCl_3$ (40 wt % aqueous solution) was added to the water. Ground tire rubber (Edge Rubber, Chambersburg, Pa.) was added to the water with stirring until all the rubber particles were dispersed in the water phase to form a slurry. Polymer latex was added to the slurry and the stirring continued for 15 minutes. The coagulated polymer/rubber slurry mixture was allowed to equilibrate for 12 hours and was filtered using a 10 micron filtering sock to obtain a polymer/rubber solid mixture. The solid was washed three times with water through the filtering sock. Excess water was squeezed out and the damp solid was dried in a vacuum oven at 60° C. for 12 hours to yield a granular crumb mixture.

TABLE 1

Preparation Of Polymer/Rubber Crumb Mixtures

| Sample | Water g | $FeCl_3$ (40%) g | GTR g (mesh)[1] | Latex[2] (50%) g |
|---|---|---|---|---|
| 1 | 1000 | 0 | 250 (80) | 0 |
| 2 | 937.5 | 4.7 | 187.5 (8) | 125 (A2) |
| 3 | 937.5 | 4.7 | 187.5 (80) | 125 (A2) |
| 4 | 937.5 | 4.7 | 187.5 (200) | 125 (A2) |
| 5 | 875 | 9.4 | 125 (80) | 250 (A2) |
| 6 | 812.5 | 14.1 | 62.5 (80) | 375 (A2) |
| 7 | 937.5 | 4.7 | 187.5 (80) | 125 (C1) |
| 8 | 3750 | 18.8 | 750 (80) | 500 (C1) |
| 9 | 875 | 9.4 | 125 (80) | 250 (C1) |
| 10 | 3500 | 37.5 | 500 (80) | 1000 (C1) |
| 11 | 837.5 | 16.9 | 87.5 (80) | 325 (C1) |
| 12 | 775 | 16.9 | 25 (80) | 450 (C1) |
| 13 | 750 | 18.8 | 0 | 500 (C1) |

[1] 8 mesh is 2460 μm sieve particle size; 80 mesh is 150 μm sieve particle size; 200 mesh is 74 μm sieve particle size.
[2] Polymer A2 (46 BA/52 MMA/1 MAA/1 Adhesion Promoter; Tg +11° C.); Polymer C1 (65 BA/34 MMA/1 MAA; Tg –16° C.).

PREPARATION EXAMPLE 2

Thermoplastic Processing of Crumb Mixtures into Shapeable Composite Material Sheets a) Compression Molding: 250 g of the crumb mixture (<5 wt. % moisture content) was processed in a two-roll mill at 195° C. for 2 minutes and compression molded by a Reliable Hydraulic Press (Reliable Rubber & Plastics Machinery Company, North Bergen, N.J.) at 195° C. between steel plates fitted with a 0.102 cm (40 mil thick) 25.4 cm×25.4 cm (10 inch×10 inch) frame for a total of 5 minutes at the following pressures: 1 minute at 3.45E7 Pascal (5000 psi); 1 minute at 6.89E7 Pascal (10000 psi) and 3 minutes at 1.65E8 Pascal (24000 psi), followed by cooling under a pressure of 1.65E8 Pascal (24000 psi) at room temperature for 5 minutes in a cool press fitted with circulating water.

b) Extrusion: The crumb mixture was processed by extrusion directly, without going through a two-roll milling step. The dried crumb mixture was extruded using a Leistritz counter-rotating conical twin screw, with two tapered 1.9 cm (¾ inch) diameter screws rotating at 40 rpm. The main unit contained three heating zones (185-190-195° C.) and various thermocouples and cooling hoses for temperature control. The material was extruded at 2.727 kg/hr (6 lb/hr) through a 15.36 cm (6 in) wide lip die with a gap size of 0.102 cm (40 mils).

TABLE 2

Properties Of Shapeable Composite Material Sheets

| Sample | Polymer[1] | Rubber (mesh)[2] | P/R Ratio (wt %) | Tensile (psi) | Elongation (%) | LT Flex (–25° C.) | Water UT (%) |
|---|---|---|---|---|---|---|---|
| 1C[3] | — | 80 | 0/100 | 148 | 105 | Pass | 11 |
| 2 | A2 | 8 | 25/75 | 170 | 137 | Pass | 25 |
| 3 | A2 | 80 | 25/75 | 414 | 199 | Pass | 16 |
| 4 | A2 | 200 | 25/75 | 448 | 200 | Fail | 19 |
| 5 | A2 | 80 | 50/50 | 681 | 377 | Fail | 41 |
| 6 | A2 | 80 | 75/25 | 1027 | 477 | Fail | 73 |
| 7 | C1 | 80 | 25/75 | 215 | 248 | Pass | 36 |
| 8 | C1 | 80 | 25/75[4] | 187 | 329 | Pass | 21 |
| 9 | C1 | 80 | 50/50 | 164 | 448 | Pass | 43 |

TABLE 2-continued

Properties Of Shapeable Composite Material Sheets

| Sample | Polymer[1] | Rubber (mesh)[2] | P/R Ratio (wt %) | Tensile (psi) | Elongation (%) | LT Flex (−25° C.) | Water UT (%) |
|---|---|---|---|---|---|---|---|
| 10 | C1 | 80 | 50/50[4] | 143 | 545 | Pass | 26 |
| 11 | C1 | 80 | 65/35 | 171 | 969 | Pass | 27 |
| 12 | C1 | 80 | 90/10 | 183 | 1228 | Pass | 23 |
| 13C[3] | C1 | — | 100/0 | 100 | 683 | Fail | 28 |

LT Flex is low temperature flexibility;
Water UT is water uptake. (Test methods below)
[1] Polymer A2 (46 BA/52 MMA/1 MAA/1 Adhesion Promoter; Tg +11° C.); Polymer C1 (65 BA/34 MMA/1 MAA; Tg −16° C.).
[2] 8 mesh is 2460 μm sieve particle size; 80 mesh is 150 μm sieve particle size; 200 mesh is 74 μm sieve particle size;
[3] Comparatives consist of only polymer or rubber;
[4] Extruded film. (Other Examples are compression molded).

TESTING EXAMPLE 3

Properties of Shapeable Composite Material Sheets

The testing methods are listed below and the results summarized in Table 2, above.

a) Maximum Tensile and Elongation-at-Break Measurement

Composite samples from Preparation Example 2 were cut in rectangular strips 7.56×1.28 cm (3"×½") from the molded sheets 0.102 cm thick (40 mil). Mechanical testing was carried out following the ASTM D-2370 protocol (ASTM Volume 06.01, February 2008) on a Tinius Olsen H10KS tensile tester (Tinius Olsen Inc., Horsham, Pa.). The crosshead rate was 2.56 cm/min (1.0 in/min), and a gauge length of 2.56 cm (1.0 in). The test was run under controlled temperature of 23° C. and controlled relative humidity of 50%. From this test, the elongation-at-break, maximum stress (tensile strength) and break energy for the samples were determined.

b) Low Temperature Flexibility

Low temperature flexibility was tested according to ASTM D-522-93A (Reapproved 2008). Wet films are cast on aluminum panels using a 0.102 cm (40 mil) drawdown bar and allowed to dry 3 days at 23° C. (75 F)/50% Relative Humidity. Panels are then dried in a 49° C. (120 F) oven for 7 days. 2.56 cm (1 in) wide pieces of coated panel are cut perpendicular to the direction of the drawdown and allowed to equilibrate 4 hours at a temperature of −25° C. One inch panels are bent over a 1.28 cm (½ in) mandrel at −25° C. and evaluated for film cracking and rated as pass for no cracking and a fail for any cracking.

c) Water Uptake (Water UT)

Water uptake was carried out according to ASTM D-471-06 (2006). A 0.064 cm (25 mil) drawdown of coating is applied to silicone coated release paper and allowed to dry four hours. A second 0.102 cm (40 mil) drawdown, using a wider drawdown bar, is made on top on the first and allowed to dry to provide a final dry film thickness of 0.051 cm (20 mil). The coating samples are cured for 7 days at 50% relative humidity and 23° C. (75 F), lifted from the release paper and turned over to dry an additional 7 days (total cure time=14 days). A 20 mm disc is cut from the cured sample using a number 15 cork borer. The disk is weighed and then immersed in a 56.6 g (2 oz) jar of distilled water. The disc is periodically removed from the water, surface dried with filter paper and weighed. Percent swelling is reported as weight of the wet disc minus weight of the dry disk divided by weight of the dry disc times 100.

As shown in Table 2, above, the combination of polymer and rubber as a composite material have a positive effect on the mechanical properties compared to the waste rubber vulcanizate or thermoplastic polymer component alone. The properties can be modified by adjusting parameters including, but not limited to, the following parameters: Polymer/rubber ratios, polymer compositions, GTR particle sizes. The composite resin can be thermoformed into articles by both compression molding and extrusion, in the same way as a thermoplastic.

PREPARATION AND TESTING. EXAMPLE 4

Traffic Marking Tapes

Shapeable composite material sheets were prepared as follows. Polymer/rubber granular crumb mixtures were prepared according to the procedure of Example 1 using the polymers and polymer:rubber ratios for each Sample as shown below in Table 3. Coagulation of the latex polymer was achieved as described in Example 1, using $FeCl_3$ in the same proportions described in Example 1 (i.e. 37.5 g of 40% $FeCl_3$ solution per 1000 g of 50% solids emulsion polymer latex). Shapeable composite material sheets were prepared with a thickness of 0.102 cm (equivalent to 40 mils), using the processing conditions described below and in Table 3. In Table 3, below, the following abbreviations are used to describe the processing conditions of the polymer/rubber composites:

Process P1=compression molded;
Process P2=cold blended, and compression molded;
Process P3=cold blended, wet milled, extruded, and compression molded;
Process P4=cold blended, extruded, and compression molded.

In the abbreviations, cold blending refers to the preparation of the polymer/rubber crumb mixtures described in Example 1, which includes coagulation of the latex. Compression molding and extrusion were performed as described in Example 2. Sample 15 was additionally wet milled under ambient conditions using a Disk Mill method. The disk mill is described in U.S. Pat. No. 4,614,310 and the polymer/rubber crumb mixture of Sample 15, as a slurry, passes through the mill just once. For each Sample, compression molding is the final processing step that produces the shaped composite material sheets.

For each polymer/rubber composite sheet, a commercial quick setting traffic paint, Fastrack™ 3427 (Dow Advanced Materials, Philadelphia, Pa.), was drawn down over the polymer/rubber composite layer (backing) using a 0.038 cm (15 mil) gap, and conditioned as described below. The strength of the adhesion between the applied traffic paint and the shapeable composite material backing layer was evaluated by the following methods: Dry cross hatch adhesion, wet cross hatch adhesion, and wet knife peel adhesion (see test procedures below Table 3). Polymers with the following polymer compositions were used in the polymer/rubber composites of Table 3, below:

Polymer A1 (46 BA/53 MMA/1 MAA; Tg+11° C.)
Polymer A2 (46 BA/52 MMA/1 MAA/1 Adhesion Promoter; Tg+11° C.)
Polymer A3 (46 BA/52 MMA/1 MMA/1 nDDM; Tg+11° C.)
Polymer B (61 BA/39 MMA; Tg−11° C.)
Polymer B1 (61 BA/38 MMA/1 MMA; Tg−11° C.)
Polymer C1 (65 BA/34 MMA/1 MAA; Tg−16° C.)
Polymer D1 (77 BA/22 MMA/1 MAA; Tg−30° C.)

TABLE 3

Paint Adhesion to Polymer/Rubber Composite Sheets

| Sample | Polymer | Rubber (mesh)[1] | P/R Ratio (wt %) | Process[2] | X-Hatch Dry (% left) | X-Hatch Wet (% left) | Peel Wet (rating) |
|---|---|---|---|---|---|---|---|
| 1C[3] | — | 80 | 0/100 | P1 | 0 | 0 | 0 |
| 14 | A1 | 80 | 35/65 | P2 | 97 | 80 | 6 |
| 15 | A2 | 8/80[1] | 50/50 | P3 | 100 | 100 | 8 |
| 16 | A3[4] | 80 | 35/65 | P2 | 100 | 98 | 7 |
| 17 | B | 80 | 35/65 | P2 | 99 | 70 | 6 |
| 18 | B1 | 80 | 35/65 | P2 | 100 | 85 | 4 |
| 19 | C1 | 80 | 35/65 | P4 | 72 | 48 | 2 |
| 20 | C1 | 80 | 50/50 | P4 | 60 | 50 | 2 |
| 21 | D1 | 80 | 35/65 | P2 | 63 | 43 | 2 |

[1]8 mesh is 2460 μm sieve particle size; 80 mesh is 150 μm sieve particle size; Sample 15 used 8 mesh GTR, but was processed by the method of Process P3, which includes wet milling; after wet milling, the rubber particles are approximately 80 mesh size.
[2]Process P1 = compression molded; Process P2 = cold blended, and compression molded; Process P3 = cold blended, wet milled, extruded, and compression molded; Process P4 = cold blended, extruded, and compression molded.
[3]Comparative 1C consists of only ground tire rubber;
[4]Polymer A3 has a weight average molecular weight, Mw, of approximately 35,000-50,000 (the other polymers listed have MW typical of conventional emulsion polymerizations, typically greater than 1,000,000).

The data in Table 3, above, show that the traffic paint has very poor adhesion to the ground tire rubber backing, as seen by all 3 test methods (Table 3, Comparative Sample 1C). Comparing Samples 17 and 18 (comprising polymers B and B1, respectively, which differ by 1% acid monomer; B comprises no acid monomer, whereas B1 has the equivalent polymer composition except with 1% MAA), it can be seen that the 1% acid monomer has little effect on the paint adhesion to the shapeable composite material layer. Similarly, for polymer composition C1, Samples 19 and 20 reveal little difference in adhesion for the polymer:rubber ratios of 35/65 versus 50/50.

Comparison of polymer/rubber composites comprising polymers A1, A2 and A3 demonstrates that both A2 (comprising 1% in-polymerization nDDM to lower molecular weight) and A3 (inclusion of 1% adhesion promoting monomer in the polymer; this polymer rubber composite was also wet-milled) may result in improved paint-backing adhesion compared to that for A1, the improvement being more evident in the wet-adhesion tests (see Samples 14, 15, and 16).

Additionally, the data as a whole depict a trend in that, by varying the Tg, the polymer/rubber composites comprising the softer polymer (lower Tg) compositions result in lower paint-backing adhesion for the 3 test methods used in this work (see, for example, Samples 19-21 versus Samples 14-18).

Wet Cross Hatch Adhesion Test

Cross hatch adhesion testing was used to quantify the relative strength of the adhesive bond between the coating and the substrate. The same lot of Fastrack™ 3427 paint was applied via drawdown to each substrate. Two drawdowns were made on each substrate sample using a 15 mil gap bar. The freshly coated samples were placed in a constant temperature room at 23° C. (75 F) and 50% relative humidity to dry for 7 days. Then, all samples were covered with a water soaked cheesecloth for 30 minutes. After the cheesecloth was removed, the coated substrates were wiped thoroughly dry with a paper towel, before being crosshatch scored with a knife. The crosshatch scoring was achieved by placing a metal template on top of the coated sample and using the knife to make cuts in each of the 11 parallel cutouts on the template. The template was then rotated 90° and the cuts repeated to complete a pattern of 100 small squares within a 2 cm by 2 cm square area. 3M Scotch Tape™ (#720; 3M, St. Paul, Minn.) was adhered to the scored portion of the coating using the non cutting end of the knife to rub the tape onto the coating to ensure a good bond. The non-adhered end of the tape was then quickly pulled at a 180° angle to the adhered portion of the tape to remove the tape from the coating. The amount of coating remaining on the substrate following the tape removal was then rated as a percentage of the original coating coverage (100%), and recorded as the average of 2 test samples, Table 3. Accordingly, a higher percentage of the coating remaining equates to better adhesion of the coating to the polymer-rubber composite substrate.

Dry cross hatch adhesion was evaluated and recorded similarly, except the coating was not soaked with a wet cheesecloth after drying in the constant temperature room for 7 days.

Knife Peel Test

Traffic tape laminates were prepared as described above for the wet cross hatch adhesion test, but without the cross hatch scoring and adhesion of 3M Scotch Tape™.

Instead, 2 knife cuts were made through the test film forming an X intersecting at about a 30° angle. Using the point of the knife, the latex paint was peeled from the substrate, at the point of intersection. The degree of peeling difficulty (recorded in Table 3 as the average of 2 test samples) was subjectively rated according to the following scale:

Knife Peel Ratings
10—no peeling
9—very difficult
8—difficult
7—moderately difficult
6—slightly to mod. difficult 5—slightly difficult
4—fairly easy
3—easy
2—very easy
1—falls off

We claim:

1. A method of making a shapeable composite comprising:
   forming a mixture by (i) treating an aqueous composition comprising one or more aqueous thermoplastic acrylic or vinyl polymer emulsion to increase the particle size of the polymer to a weight average particle size of 1 μm or more, and, optionally, subjecting the treated aqueous polymer to dewatering to form a crumb mixture; and, (ii) combining the one or more acrylic or vinyl polymer with one or more waste rubber vulcanizate having a sieve particle size ranging from 10 to 600 μm in the amount of from 15 to 95 wt. %, based on the total weight of polymer and rubber to form a crumb slurry,
   wherein, the combining can take place before the treating of the aqueous composition, during the treating of the aqueous composition, after the treating of the aqueous composition but before any dewatering, and after any dewatering; and,
   (iii) thermoplastic processing the mixture to form the shapeable composite.

2. The method as claimed in claim 1, wherein the treating to increase the particle size of the polymer is chosen from coagulating, freeze drying, and coagulating followed by freeze drying.

3. The method as claimed in claim 1, wherein the amount of waste rubber vulcanizate in the mixture ranges from 40 to 95 wt. %, based on the total weight of polymer and rubber.

4. The method as claimed in claim 1, wherein the waste rubber vulcanizate has a sieve particle size of from 10 to 180 μm.

5. The method as claimed in claim 1, wherein the thermoplastic processing is chosen from extrusion, calendering, two roll milling, injection molding, compression molding, and combinations thereof.

6. The method as claimed in claim 5, wherein the thermoplastic processing forms a sheet or film and the method further comprises laminating the sheets or film with other sheets, films or lamina.

* * * * *